United States Patent [19]
Stewart et al.

[11] Patent Number: 5,820,759
[45] Date of Patent: Oct. 13, 1998

[54] INTEGRATED AQUACULTURE AND BIOREMEDIATION SYSTEM AND METHOD

[75] Inventors: E. Allen Stewart, Punta Gorda; Mark Zivojnovich, Ocala, both of Fla.

[73] Assignee: MFM Environmental Co., Ocala, Fla.

[21] Appl. No.: 912,716

[22] Filed: Aug. 19, 1997

Related U.S. Application Data

[60] Provisional application No. 60/027,988, Oct. 9, 1996.

[51] Int. Cl.$^6$ ........................................................ C02F 3/32
[52] U.S. Cl. ........................ 210/602; 210/614; 210/747; 210/149; 210/170; 47/1.4; 119/225
[58] Field of Search ....................... 47/1.4; 119/225–227; 210/602, 612, 614, 631, 747, 149, 170, 175, 242.1, 242.2

[56] References Cited

U.S. PATENT DOCUMENTS

| | | |
|---|---|---|
| 3,635,816 | 1/1972 | Golub ...................................... 210/602 |
| 3,711,392 | 1/1973 | Metzyer .................................. 210/612 |
| 4,169,050 | 9/1979 | Serfling et al. ........................ 210/602 |
| 4,872,985 | 10/1989 | Dinges .................................... 210/602 |
| 4,888,912 | 12/1989 | Murray ...................................... 47/1.4 |
| 4,959,084 | 9/1990 | Wolverton et al. ..................... 210/602 |
| 5,322,035 | 6/1994 | Haws et al. ............................. 119/227 |
| 5,584,991 | 12/1996 | Wittstock et al. ...................... 210/170 |

*Primary Examiner*—Thomas G. Wyse
*Attorney, Agent, or Firm*—Allen, Dyer, Doppelt, Milbrath & Gilchrist, P.A.

[57] ABSTRACT

An integrated aquaculture system and method are provided that include interrelated and symbiotic modules for adaptively bioremediating wastewater, producing food in the form of fish, and producing plant biomass for animal feed. The system is ecologically and economically self-sustaining. In one embodiment, the system contains a fish cultivation tank, an algal floway, and a water hyacinth system. Two modes of operation are contemplated: a recycle mode and a flow-through mode. The water hyacinth system includes harvesting, conveying, and chopping apparatus.

31 Claims, 5 Drawing Sheets

INTEGRATED AQUACULTURE AND BIOREMEDIATION SYSTEM AND METHOD

CROSS-REFERENCE TO RELATED APPLICATION

This application claims priority from provisional application 60/027,988, filed Oct. 9, 1996, the entire specification of which is incorporated herein by reference.

BACKGROUND OF THE INVENTION

1. Field of the Invention

The present invention relates to food growth and water treatment systems and, more particularly, to ecologically beneficial systems of aquaculture and bioremediation. The present invention also relates to plant systems for integrating the production of biomass and the treatment of degraded water.

2. Description of Related Art

In the United States, aquaculture has, until recently, generally been viewed as a minor branch of agriculture. A typical view of aquaculture encompasses government projects for stocking streams and lakes, or of small farm ponds used to raise catfish, or other native species, for the purpose of recreational fishing or as an ancillary enterprise to a much larger agricultural activity. However, this image has been seriously challenged over the past two decades by a growing, large-scale aquaculture industry, typified by the extensive growth of catfish farming in the Southern United States, and particularly in the Delta region of Mississippi.

By the end of the 1980s, U.S. aquaculture contributed an estimated 543,000 tons of product annually, with an approximate "pond-bank" value of $750 million. Most of this was in the production of goods for human consumption, with catfish being the highest producer, followed by trout, crayfish, oysters, shrimp, Tilapia, and Hybrid Striped Bass. In 1987, catfish production in Mississippi, which accounts for 91% of the catfish production in the United States, amounted to about 140,000 tons, with a retail value of $500 million. In 1993 the total catfish production was reported to have increased to 248,000 tons.

By the early 1990s three notable trends had emerged throughout the world, and in the United States in particular, involving the aquaculture industry. The first of these was an increase in per capita consumption of fish and related "seafood" in the United States from a long-term average of 4.5 kg/yr (10 lbs/yr) to 7.0 kg/yr (15.2 lbs/yr) in 1994. A review of consumer attitudes in the U.S. conducted by the Department of Commerce in 1991 included indications that this gain in seafood popularity was attributable largely to the growing concerns regarding health and diet. Seafood, and fish in particular, are believed to be healthy and contributory to longevity. This belief has generally been supported by medical evidence. With this increase in demand, seafood distributors have responded by making their products more diverse and accessible, which in turn has contributed to increasing consumption.

A second trend is a growing concern regarding products harvested from wild populations, which has emerged from not only documentation of pollutants, such as mercury and PCB, accumulating within animal tissue, but also regarding environmental damage resulting from harvesting methods.

The U.S. Department of Commerce survey previously cited concluded that consumption of seafood is likely to grow only as long as consumer confidence in its quality and safety is retained. It was noted also that consumer attitude towards farm-raised fish is positive, with the consensus that such products are likely to be more wholesome because of benefits associated with the control of both feeding strategies and environmental conditions. This feeling was expressed even more strongly for the concept of branded aquaculture products. Thus consumer demand for safe, quality-controlled seafood products will likely have significant influence upon existing markets, and the development of new markets.

The third trend is a growing demand that seafood harvesting and production not result in environmental degradation or species exploitation, as exemplified by recent laws passed in such states as Texas and Florida, placing bans or restrictions upon commercial harvesting. Aquaculture has come to be viewed, on an international scale, as a method of protecting and sustaining declining "wildstock" populations. There are scientifically supported indications that the projected capacity of the oceans to sustain the human consumptive demands is rapidly being approached by the world's expanding population. It is believed that the oceans' sustaining capacity is about 100 million tons per year. These pressures are likely to increase market reliance upon aquaculture.

While such trends are encouraging to the industry, aquaculture facilities, to be successful, must be carefully designed to ensure durability and flexibility, and must be efficiently managed to establish predictable product yields and quality at the lowest practical cost per unit production. For example, water quality, climate, and other environmental influences, which can profoundly impact productivity, should be considered and incorporated into design and operational strategies. Projections of productivity and yield should reflect the impact of these influences. For example, it has been noted that as the intensity of operational management increases, the yield per unit of production area can increase significantly. For example, a closed recirculating system combined with a high-intensity effort, can achieve up to three orders of magnitude greater production annually than a low-intensity effort such as static ponds. Such increases may be attributable largely to improvements in water quality control.

However, the traditional paradigm of monocultural, static pond cultivation, or conventional intensive systems supported by expensive water treatment systems, offer no benefits from ancillary products. Typically, achieving water quality improvements has required restrictive increases in capital expenditures, labor costs, and energy demands. It is therefore desirable to design and implement a relatively low-net-cost, high-water-quality system that can also benefit from the advantages present in local environmental, social, and economic conditions. If such a system could be developed, not only excellent water quality at higher management intensities, but also reduced costs associated with water treatment and recycling, would provide a competitive advantage within the industry.

It has been determined that fish aquaculture operations can contribute signficant loads of organic and nutrient pollutants to the contiguous environment, and therefore often represents a potentially troublesome source of water pollution. A number of aquatic plant-based aquaculture systems have been studied and successfully implemented that not only offer the capacity for the removal of these pollutants, but also incorporate them into plant biomass, which, when harvested and processed, can represent a marketable product.

SUMMARY OF THE INVENTION

It is therefore an object of the invention to provide an integrated plant and fish aquaculture system that is economical to operate, complies with environmental regulations, is more efficient in land utilization, and provides a diversity of products.

It is another object to provide such an aquaculture system to increase production per unit area while reducing cost per unit production.

It is a further object to provide such an integrated aquaculture system that can substantially enhance unit area production within pond systems.

It is an additional object to provide a system and method for growing and harvesting vascular plant species that maximizes nutrient removal from water to be treated.

It is yet another object to provide such a system and method for efficiently managing biomass.

These objects and others are achieved by the integrated aquaculture system and method of the present invention, aquaculture being defined as an agricultural activity, or a series of such activities, involving, as part or all of the activity, the purposeful cultivation of any aquatic organism, whether plant, animal, or protist, either separately or combined, with the intent of generating a product. Such a product may be associated not only with the direct use of the harvested biomass, but also with benefits realized as a direct or indirect result of the production of biomass, or the complex dynamics of ecological relationships established by the involved organisms.

The benefits of the system of the present invention comprise enhanced water quality, dissolved gas transfer, thermal regulation, environmental restoration, synergy associated with symbiotic relationships, and internal food production. In other words, the system permits an arrangement of subsystems by which the evolved complexity of a plurality of organisms interface to establish organization and stability within the overall system. Consideration of such an integrated approach is not only helpful; it is highly desirable for long-term efficiency and optimal economic returns. Such an integrated system offers opportunities to capture and recover nutrients at a lower cost while resulting in improved overall productivity and the elimination of water pollution impacts.

An exemplary integrated system comprises one in which vascular aquatic plants, fish, and algae are being cultivated and in which those subsystems are in fluid communication. A high production of fish demands high feeding rates and results in high rates of excretion and respiration, which encourages the depletion of dissolved oxygen and the accumulation of various "waste" materials such as carbon dioxide, biodegradable organic compounds, nitrogen in the form of ammonia, and excess phosphorus. These "waste" materials stimulate extensive plant growth, and therefore the productivity of the aquatic plant system is increased by the increased fish production. In turn, the higher plant production facilitates the reduction of key nutrients, namely, carbon dioxide, ammonia-held nitrogen, and phosphorus, thereby preventing their accumulation, whic would otherwise reduce fish production. The plant production therefore yields higher-quality water, which, as previously noted, encourages higher fish production. There is, then, a positive feedback between the aquatic plant system and fish cultivation.

The third component of the system, a cultured alga subsystem, serves to further remove excess nutrients from the water emerging from the aquatic plant subsystem and also replenishes oxygen to the water.

A review of the market supports the premise that the production from both the plant and animal (fish) systems could be harvested, processed, and sold for a high enough unit price that such an integrated system would be both possible and practical, and would result in a lower unit production cost than either subsystem operated independently; that is, there would be a synergy between the systems. The increase in fish production in such a system could be measured as a multiple of some standard production that might be expected with just a static pond system. The ratio of the enhanced production rate to this standard or base rate is referred to herein as $K_q$.

DETAILED DESCRIPTION OF THE PREFERRED EMBODIMENTS

A description of the preferred embodiments of the present invention will now be presented with reference to FIGS. 3–6.

Broadly, the integrated aquaculture system of the present invention comprises three interrelated subsystems for the treatment of water and the production of useful biomass. A first subsystem is for culturing a desired species of fish and comprises an enclosed body of water having an inlet for admitting water and an outlet for removing water degraded by fish excretion. A second subsystem includes vascular aquatic plants for treating the degraded water. The aquatic plant subsystem comprises a plant species adapted to remove excess nutrients and other pollutants from the degraded water. A third subsystem includes cultured algae receiving water from the aquatic plant subsystem outlet. The algae subsystem further removes excess nutrients from the water emerging from the aquatic plant subsystem and replenishes dissolved oxygen to the water. The water exiting the cultured alga subsystem is sufficiently clean and oxygenated to support growth of the desired fish species.

Figure 5:
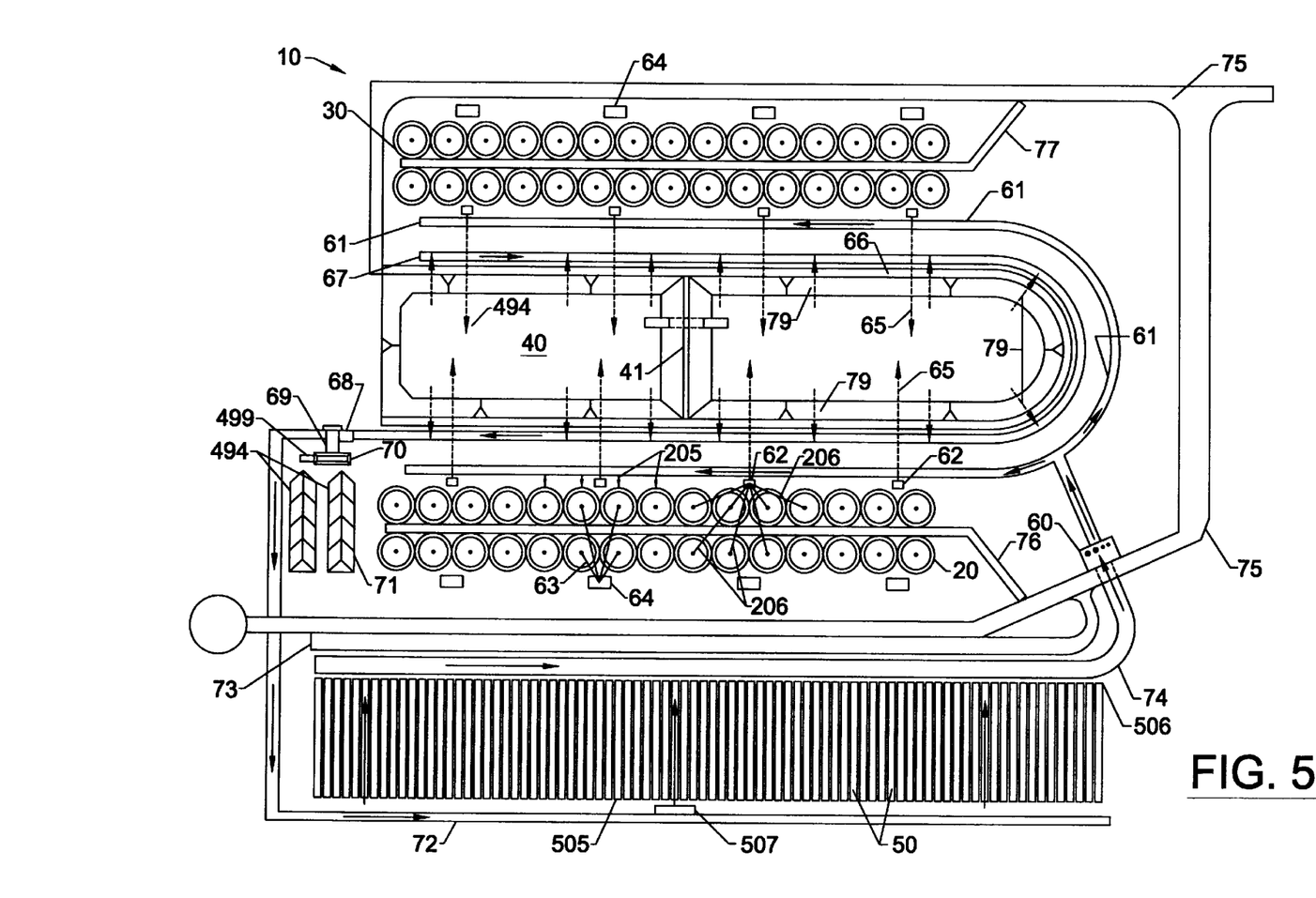
FIG. 5 is a generalized schematic diagram of the integrated aquaculture system in recycle mode.

In the preferred embodiment, illustrated in FIG. 5, the floating aquatic vascular plant comprises the water hyacinth, and the algae comprise periphytic algae within an arrangement known as an Algal Turf Scrubber (ATS). The water hyacinth are disposed within a management system to be referred to herein as a Water Hyacinth System (WHS), which optimizes plant growth, nutrient uptake, and plant biomass harvesting.

The integrated system maximizes high-quality production and subsequent use of plant and animal biomass and any associated services resulting from benefits attendant with the production of this biomass, while assuring no net gain in nutrient or organic pollutants within the area, which may comprise a water management area, in which the system is located. The system consequently is operated such that in the production of animal biomass (fish), the excreted and lost materials that are potential water pollutants (such as nitrogen, phosphorus, carbon dioxide, dissolved salts, and oxygen-demanding organic compounds) are effectively removed and captured by one or more plant cultivation subsystems, and that the flow of these materials is such that the potential of any negative (i.e., toxic, growth-inhibiting, mutagenic, teratological, predatory, pathogenic, or parasitic impacts are minimized to the greatest extent practicable. In addition, the plant subsystem facilitates the replenishment of dissolved oxygen as may be required by the fish population, with the intent of sustaining a predetermined dissolved oxygen concentration, preferably not less than 5 mg l$^{-1}$, which is an exemplary standard in Florida for supporting a healthy aquatic community.

Furthermore, the system should include all support systems required to ensure that over the full range of expected environmental fluctuations, the overall system will operate in a manner that will facilitate efficient harvesting, transport, monitoring, documentation, processing, storage, quality control, marketing, and delivery of the various products, while sustaining protection of the environment and the facilities, and the safety and health of the facility employees and the surrounding communities. This includes, for example, buildings; ponds; tanks; harvesting and feeding equipment; instrumentation, process control, and computer systems; pumping systems; valving; screens and gates; piping; geotextiles and erosion control; grounds equipment and maintenance; aeration equipment; processing and operational management equipment; boilers; compressors; solids handling and conveyance equipment; administrative offices; utilities; maintenance facilities; personnel support facilities; expendables such as feed, medications, and fuels; fingerlings and brood stock; stormwater management and environmental control systems; communication systems; electrical systems; storage facilities; research and development facilities; laboratory and testing facilities; chemical feed systems; access and signage; safety provisions; access control and predator control measures.

FISH AQUACULTURE SUBSYSTEM AND METHOD

Figure 1:
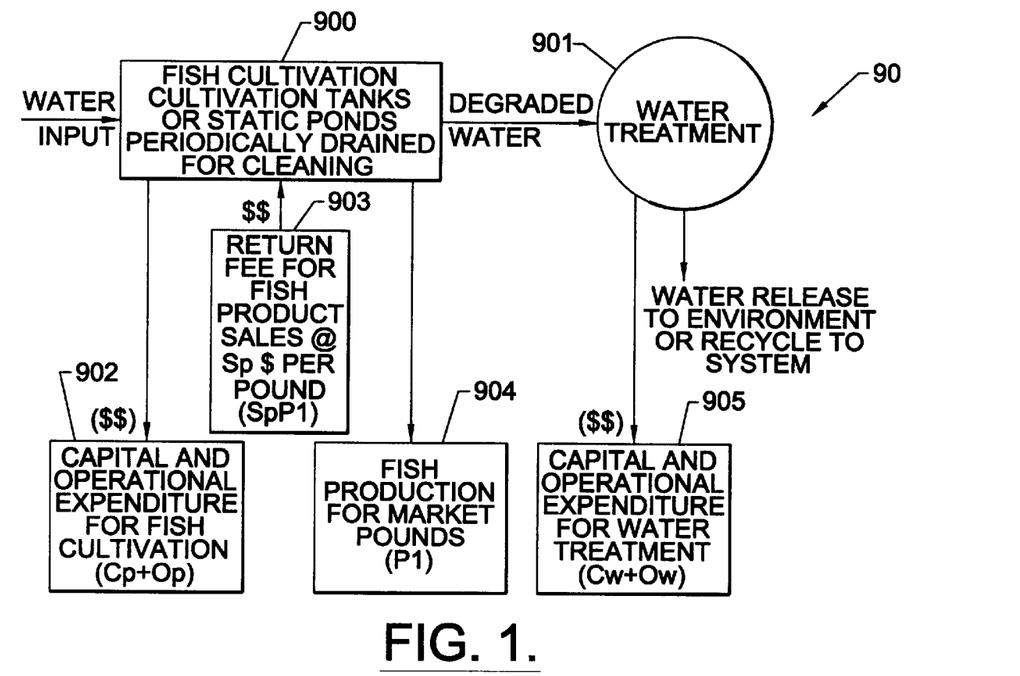
FIG. 1 is a schematic diagram of a static system model with water treatment. (Prior Art)
Figure 2:
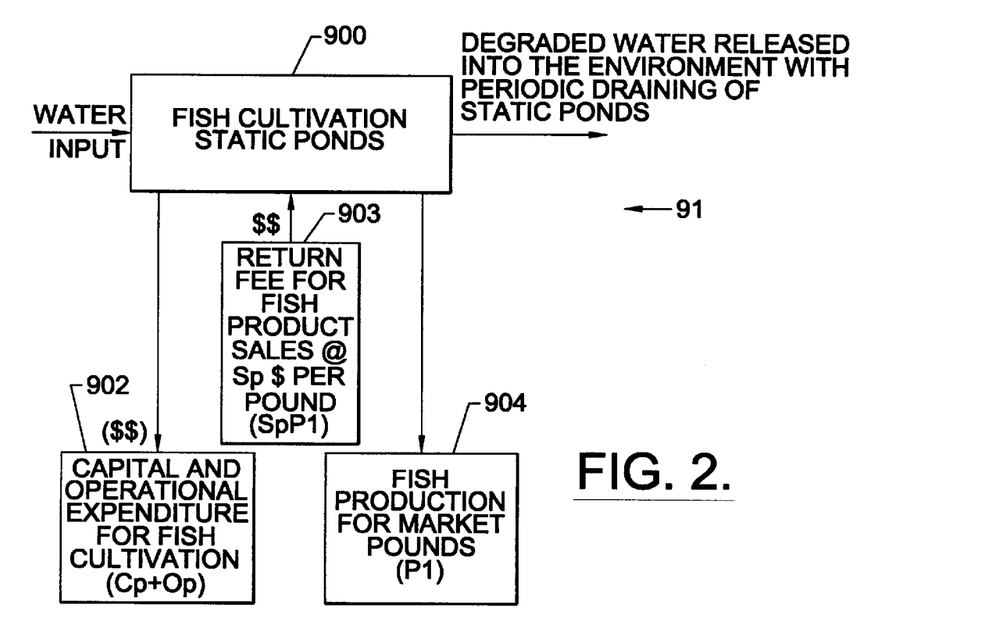
FIG. 2 is a schematic diagram of a static pond model with no water treatment. (Prior Art)

Consider a model for three potential operational strategies for fish cultivation. A simple model is the static pond system 90,91, which serves as a standard baseline. The static model, as shown in FIGS. 1 and 2, is the design that has traditionally been used by the catfish industry in Mississippi. The ponds are referred to as static (Box 900) because the water is replaced only periodically, often as infrequently as once every 5 years. There is no significant flushing or continual movement of new water. Rather, new water is introduced only as makeup for losses due to seepage or evapotranspiration, or on those occasions when the pond is drained for cleaning. Profits from static ponds can be realized if the capital costs of ponds are relatively low; there is an inexpensive and adequately large source of high-quality freshwater, and the costs of controlling pollution associated with released waters is negligible. With these advantages, the profit margin can be attractive, even with the lower production that results from accumulation of interfering water quality factors, such as high ammonia levels, low dissolved oxygen, or extensive blue-green algae blooms.

The model equation for a conventional static pond system 90 with water treatment (Box 901) is:

$$U_s = (C_p + C_w + O_p + O_w)/P_1 \qquad (1)$$

where $U_s$ is the annual cost per pound of fish produced; $P_1$, the annual fish production in pounds as the standard or base related to a static pond operation (Box 904); $C_p$, the amortized annual capital costs for pond construction; $O_p$, the annual operating costs for the fish cultivation system (Box 902); $C_w$, the amortized annual capital costs for water pollution control; and $O_w$, the annual operating costs for water pollution control (Box 905). The return fee for fish product sales at $S_p$ per pound is $S_p P_1$ (Box 903).

If regulations are such that water pollution control is not required, as represented by the system 91 of FIG. 2, then Eq. (1) for a static pond becomes:

$$U_s = (C_p + O_p)/P_1 \qquad (2)$$

Figure 3:
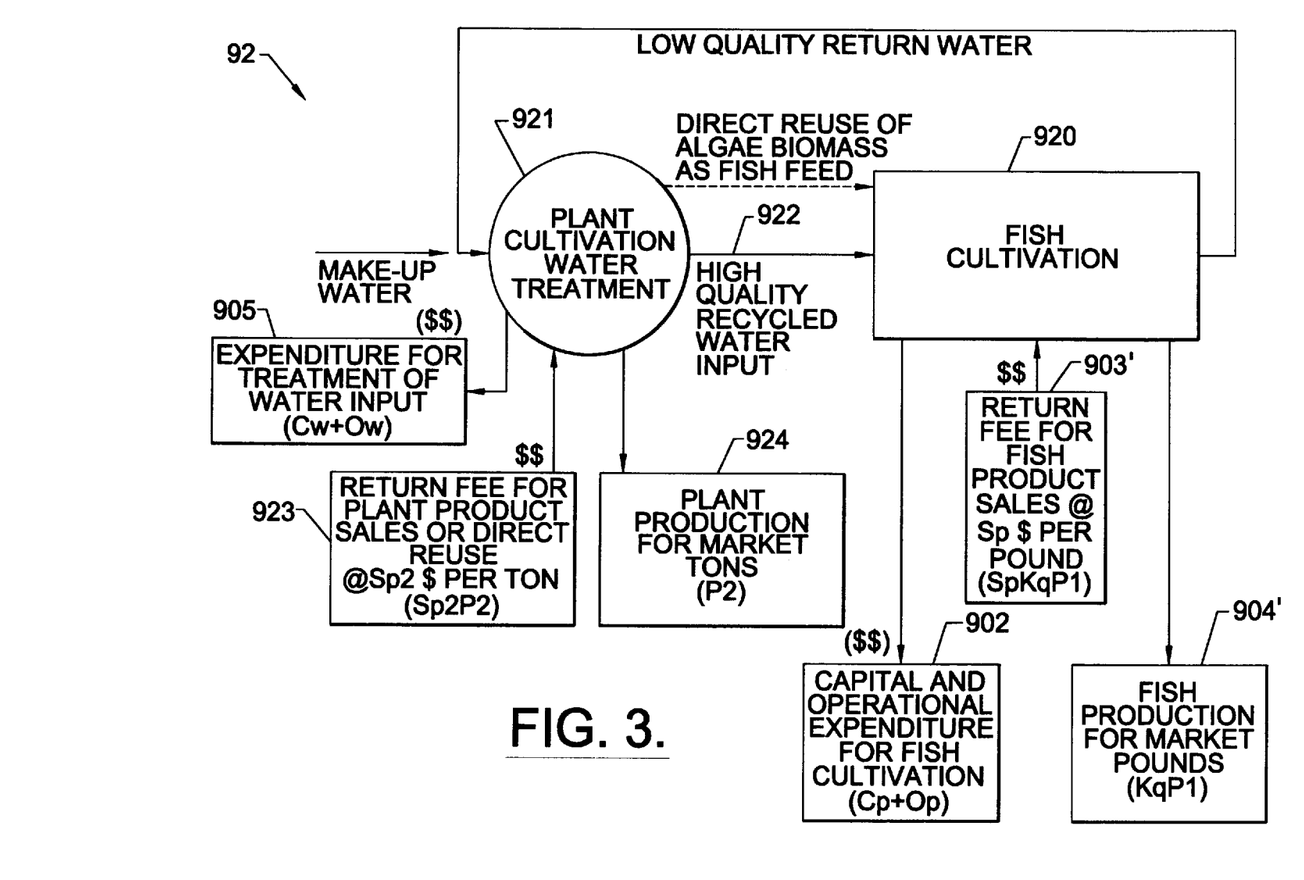
FIG. 3 is a schematic diagram of an integrated system model in recycle mode.

Now consider a somewhat more complex system 92 as represented in FIG. 3. In this case, water is treated prior to introduction into the fish cultivation system (Box 920), which is now a dynamic rather than a static pond. Degraded water from the fish cultivation unit is also treated (Box 921) and then recycled 922 to the front of the unit (Box 920) as a clean water input, thereby assuring continual flushing with a clean recirculated water source. During the course of this treatment, the excreted nutrients are recovered, for example, as plant biomass, which can be processed as a valuable product. In addition, the plant production replenishes oxygen levels within the treated water. The higher water quality then permits higher production by a factor $K_q$.

In expressing the net profit return per pound of fish product sold, the model equation now becomes:

$$U_r = (C_p + C_w + O_p + O_w - S_{p2} P_2)/K_q P_1 \qquad (3)$$

where $U_r$ is the annual cost per pound of fish production; $S_{p2}$ the average return price per ton of plant product sold from the treatment system (Box 923); and $P_2$, the annual production plant products in tons for the treatment system (Box 924).

This relationship suggests that as $K_q$ increases, plant production will increase, and the difference between the sales return from plant products and the annual cost of water treatment may decrease as well, thereby allowing the economic viability of the system to be preserved or enhanced. In other words, there is a positive feedback element encouraging the system to orient towards a higher level of production within both the fish and plant systems. As suggested earlier, the directive to establish an optimal system design depends upon discovering the maximum practical value for $K_q$.

As plant and fish production are interdependent, there is an opportunity to drive returns upward, well beyond the limited potential of approaches known in the art. This flexibility adds appeal by providing long-term stability through process diversity. By integrating the system, a great deal of self-protection, or homeostasis, can be incorporated into the operational strategy.

Figure 4:
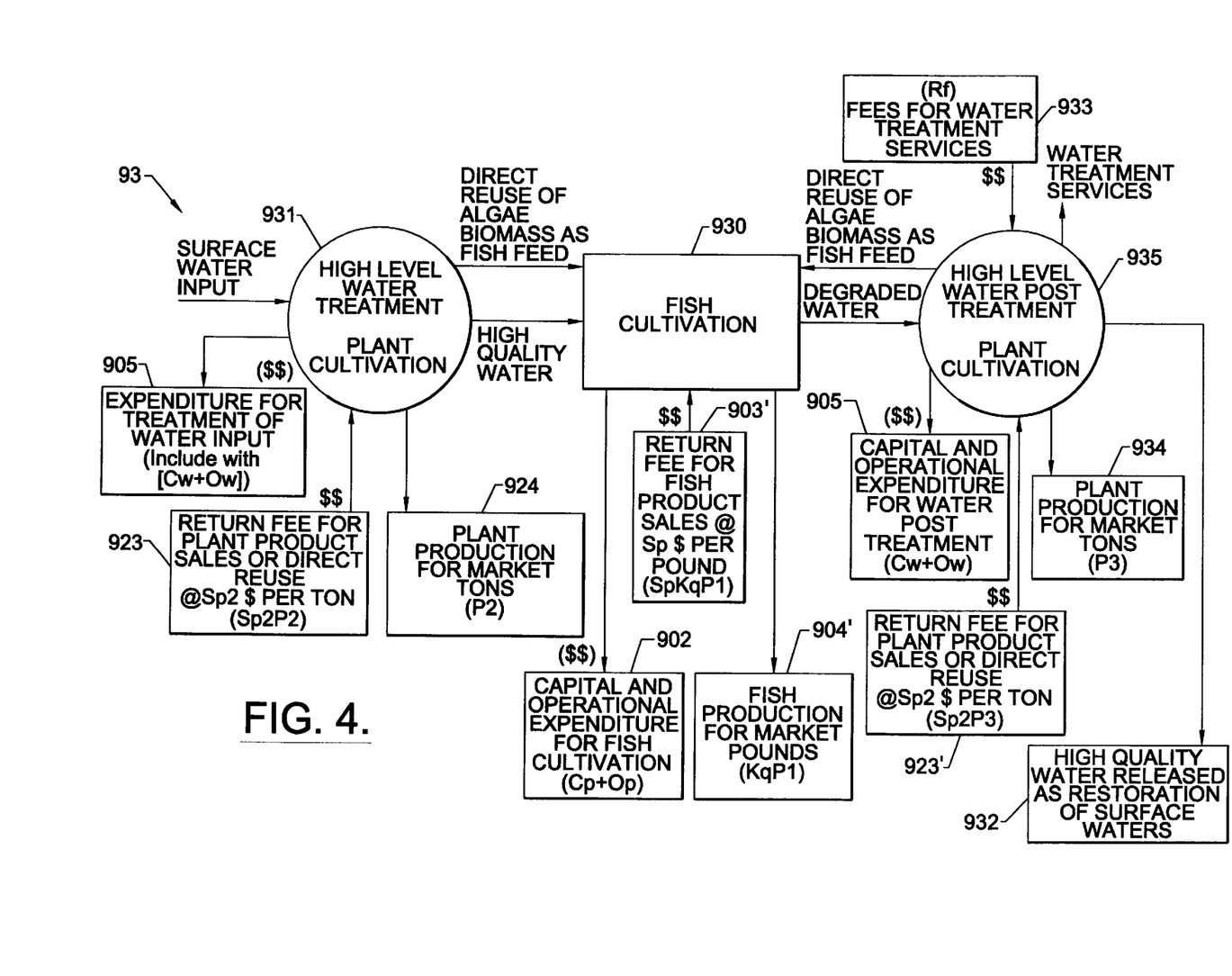
FIG. 4 is a schematic diagram of an integrated system model in flow-through mode.

An alternate embodiment 93 adds another dimension to the system. Represented in FIG. 4 is an operational mode that involves, after a first water treatment (Box 931), fish cultivation (Box 930), and a second water treatment (Box 935), instead of recycling, a release of the water back into the environment (Box 932) at a higher quality than that of the incoming water. This system provides another product—water pollution control. The model equation now becomes:

$$U_p = [C_p + C_w + O_p + O_w - S_{p2}(P_2 + P_3) - R_f]/K_q P_1 \qquad (4)$$

where: $U_p$ is the annual cost per pound of fish production; $R_f$, the annual payment for water quality improvement (Box 933); and $P_3$, the annual production of plant products in tons for the post-treatment system (Box 934).

Exemplary Fish Species

Tilapia

Each of the three exemplary fish species to be discussed offers distinct advantages and limitations, both in their cultivation, and in their existing and projected market profiles. Tilapia is the name given to a number of species belonging to the genus Oreochromis. Typically the species *O. aurea* and *O. nilotica* receive the most attention from aquaculturists, along with hybrids such as the red hybrid. This genus is native to Africa, but has escaped to native waters in Florida, as well as other subtropical and tropical parts of the world. It is very prolific; hence it has established large populations in many of Florida's lakes and steams.

Channel Catfish

Channel catfish (*Ictalurus punctatus*), like Tilapia, is also a species well suited for aquaculture, particularly pond culture. It offers the same advantages of being tolerant of crowding, noncannibalistic, and capable of enduring periods of lower water quality. In addition, it is not as temperature sensitive as Tilapia, although growth rates diminish considerably during winter periods.

Hybrid Striped Bass

Hybrid striped bass, or "sunshine bass," is a cross between a white bass female (*Morone chrysops*) and a striped bass male (*Morone saxatilis*). Interest in the cultivation of striped bass has risen since limitations were placed upon the harvesting of "wild" stock. This has left a void in the market supply, as this species has historically enjoyed popularity in Northern and Mid-Atlantic markets. It has been found that the hybrid offers the advantages of superior growth, greater disease resistance, tolerance of a wider salinity range, and an ability to withstand cooler temperatures, making it an excellent choice for aquaculture (Gempesaw et al., 1991).

The cultivation of hybrid striped bass offers different challenges to the aquaculturist than do Tilapia or catfish. The hybrid is a sports fish. It is also a predaceous fish, and is, not surprisingly, cannibalistic. This means that only fish of the same size can be reared in the same pond or tank. Rogue fish that outpace the others in growth can present production problems if not culled. In addition, because spawning is seasonal and must be done artificially, fry are expensive and available only during parts of the year. This suggests that a batch-type harvesting and marketing program is required, and operational strategies should be carefully designed to stagger harvests to meet demands throughout as much of the year as is practical.

Hybrid striped bass typically require higher water quality, more expensive feed, and are somewhat slower growers. Consequently, the production costs are higher, as are the operational risks. Production rates of Hybrid Striped Bass in static ponds in some locations may approach 4000 lb acre$^{-1}$ year$^{-1}$ (Lazur, 1995).

System Strategy

A preferred embodiment of the integrated aquaculture system 10 of the present invention (FIG. 5) comprises a plurality of means for the cultivation of all three fish species. Cultivation may be conducted within ponds 20, tanks 30, or a mixure thereof. The tanks 30 may comprise structured raceways.

PLANT CULTIVATION SUBSYSTEM AND METHOD

To meet the requirements of the fish cultivation subsystem of the system of the present invention, also considering economic feasibility, the plant cultivation subsystem preferably includes the purposeful cultivation, harvesting, and direct system reuse or processing and sale of plant material derived from one or more species that, during the course of their growth, provide predictable removal of nutrients and potentially harmful metabolic products excreted by the fish stock, while also aiding in the replenishment of dissolved oxygen supplies necessary to ensure fish health and productivity without substantially imposing, through a respiratory demand, upon oxygen supplies for the fish cultivation.

The plant cultivation system is coordinated with the recycling of water through the fish cultivation systems 20,30 to ensure adequate control of phytoplankton in ponds, in the exemplary system herein preferably to approximate levels below 40 mg m$^{-3}$ chlorophylla; total phosphorus concentration of not greater than 0.40 mg l$^{-1}$; total organic and ammonia nitrogen, or total Kjeldahl nitrogen (TKN) levels of not greater than 6.0 mg l$^{-1}$; a pH of about neutral; BOD$_5$ levels of not greater than 50 mg l$^{-1}$; and dissolved oxygen concentrations, within the fish cultivation system, of not less than 6 mg l$^{-1}$. These values, however, are not intended as limitations, as other system parameters could be contemplated by those skilled in the art for alternate embodiments of the system.

Aquatic Plant Systems

For over 20 years, the comparative effectiveness of a wide variety of aquatic plant systems has been debated. Critics of aquatic plant systems have noted the difficulty in managing and predicting performance.

When aquatic plant systems have been implemented, quite often the designers have not considered harvesting or processing of biomass as necessary components of system management. This has led to failures resulting from buildup of excessive biomass, and the consequential leaching of stored nutrients.

The farming demands of a controlled aquatic plant system have repressed application in the aquaculture industry. For example, Stickney (1994) provides considerable detail about various methods of water treatment that can be applied to aquaculture, including a number of filtration systems, and bacterial-based technologies, such as rotating biological contactors (RBC). However, the discussion of aquatic plants is limited, with only two species mentioned: water chestnuts (*Eleocharis dulcis*) and water hyacinths (*Eichhornia crassipes* [Mart] Solms). Water hyacinths are stated as having some potential as a livestock feed, but it is suggested that drying of the plants makes the economics unattractive. It is implied that the perceived difficulties in the dynamic farming of aquatic plants tend to overpower the water quality benefits they provide, and it is noted that "most Aquaculturists are more concerned about eliminating aquatic plants than they are interested in producing them."

However, in spite of this observation, Stickney (1994) is not reluctant to suggest that integration of plant and fish systems has merit as a means of improving water quality and increasing fish production. Boyd (1990) also mentions that "using water hyacinths or other aquatic macrophytes to remove nutrients and reduce the potential for phytoplankton growth in fed ponds might have practical application in tropical and subtropical" areas. Using aquatic plants to improve water quality within an integrated fish culture system has also been reviewed seriously by researchers at Texas Tech University (Parker et al., 1992).

In a recent study, Schwartz and Boyd (1995) provided some support for the use of created wetland systems for treating effluents from aquaculture operations, specifically, static catfish ponds. They do not, however, address the possibility of true integration of the wetland system into facility operations as a source of additional aquaculture products, or as a means of improving fish production, but rather offer the use of wetlands solely as a means of treating effluents from drained ponds.

Water hyacinth-based systems and the algal turf scrubber (ATS) system are well suited for coordination with fish cultivation in a tropical and subtropical environment, as they are compatible with crop management routines and operational manipulation. Further, they offer high productivity levels at the associated temperature and influx levels. Because of its oxygen-generating and phosphorus-reduction capabilities, and its ability to sustain rather high levels of production under a wide range of nutrient concentrations, the ATS system is a logical selection as a plant cultivation system for the integrated system of the present invention. The use of water hyacinths provides additional support in facilitating nitrification, reduction of BOD and suspended solids, and as a pretreatment and hydraulic equalization system.

Algal Turf Scrubber Technology Applied to an Integrated Aquaculture System

The ATS (U.S. Pat. No. 4,333,263) is operated in close association with the fish cultivation subsystem to provide necessary oxygen supplies and nutrient reduction capabilities to ensure viability of the fish stock over an expected range of environmental conditions. Secondary benefits, such as pathogen and particulate control and some further modulation of residual carbonaceous and reduced nitrogen loads, are also important contributions from ATS. Also of importance is the role ATS assumes in the sustenance of oxygen levels above approximately 5 mg $l^{-1}$ within the high-density fish cultivation systems and the potential as an internally produced feed source.

The oxygen-generating capabilities of the ATS depends upon the rate of primary production of the algae crop. When cultivated under optimal conditions related to water flow, light intensity and nutrient levels, and harvested regularly, it is possible to keep this production in a log phase, while also controlling grazers that might impose upon system productivity (Craggs et al., 1995).

The present invention includes oxygen production throught the ATS, with primary reliance upon photosynthesis during the daylight hours, and upon reaeration during the respiratory phase at night.

There is considerable reduction of both nitrogen and phosphorus through the ATS. This removal is correlated directly with plant uptake, the algae typically being about 3% nitrogen on a dry weight basis. The majority of the nitrogen remaining in the water column will be expected to be in the oxidized form, meaning there is little associated nitrogenous biological oxygen demand (NBOD).

Phosphorus dynamics within the ATS, unlike nitrogen, is not as reliant upon direct algae uptake. As noted from the Patterson data (Craggs et al., 1993), the high phosphorus removal, exceeding 1 g $m^{-2}$ $d^{-1}$, are attributable to precipitation at higher pH as calcium phosphate complexes or as hydroxyapatite (Adey, 1995; Stumm and Morgan, 1995). The increase in pH within the ATS occurs when carbon dioxide is consumed during photosynthesis. Work in Florida (Adey et al., 1993) indicates that the influence of this precipitation phenomenon within the ATS is quite significant, and can result in very low effluent levels.

Water Hyacinth Technology Applied to the Integrated Aquaculture System

The use of water hyacinths for control of nutrients within wastewaters has been developed and commercially applied in subtropical areas such as Florida. The role of a water hyacinth system within the integrated aquaculture system is to provide initial control of nitrogen and oxidation of ammonia; oxidation of CBOD; storage of residual solids and removal of total suspended solids (TSS); insulation to retain heat in winter and shade in the summer; hydraulic equalization during periods of flow diversions or fluctuations; production of high-fiber, high-protein material for livestock feed; reduction of residual toxins; attenuation of pathogens; and pretreatment of makeup waters prior to dispensing into the ATS or fish cultivation systems. Although water hyacinths are referred to herein, the plant subsystem may include monocultures or polycultures, and may include plants of the genera Eichhornia, Spirodella, Salvinia, Azolla, Lemna, and Pistia, although these are not intended to be limiting.

The biological dynamics of water hyacinths in terms of first-order kinetics was first investigated by Musil and Breen (1977), and later developed in further detail for commercial application by Stewart (1979) and Stewart et al. (1983), who established and tested a design model (HYADEM) in which total nitrogen was used as the limiting nutrient.

Work on the effectiveness of water hyacinths in treating agricultural wastes (dairy) provided an indication that in addition to direct plant uptake, extensive nitrification and consequential denitrification occur within the water hyacinth root zone (Amasek, 1989). A number of commercial applications in Florida (Stewart et al., 1987) established the ability of managed water hyacinth systems to significantly reduce nutrient loadings from wastewaters.

Considerable investigation has also been directed towards the removal of both suspended solids (TSS) and CBOD by water hyacinths. Early work by Wolverton and McDonald (1979) provided evidence that at high CBOD and TSS loadings water hyacinths could facilitate extensive reductions, approaching 400 kg $ha^{-1}$ $d^{-1}$ (357 lb $acre^{-1}$ $d^{-1}$). Similar results were documented by Hayes et al. (1987) at the Disney facility near Orlando, Fla. In a commercial application at the Iron Bridge Treatment Facility in Orlando, Amasek (1985) achieved reductions in CBOD and TSS to below 2.5 mg $l^{-1}$. Similarly, the rate of nitrification has been shown to be high within a functioning hyacinth system (Stewart, 1979; Amasek, 1989).

An analysis of the fish cultivation effluent, applied to the HYADEM model, allows projections of cultivation area, effluent quality, and plant management needs for a water hyacinth system that would serve as a pre-ATS process. This system receives flows from the fish cultivation ponds and tanks; makeup water sources; any diverted ATS water; and various waste streams that might come from plant and fish processing, or from external sources.

DESIGN AND OPERATIONAL CONSIDERATIONS

System Modes

Figure 6:
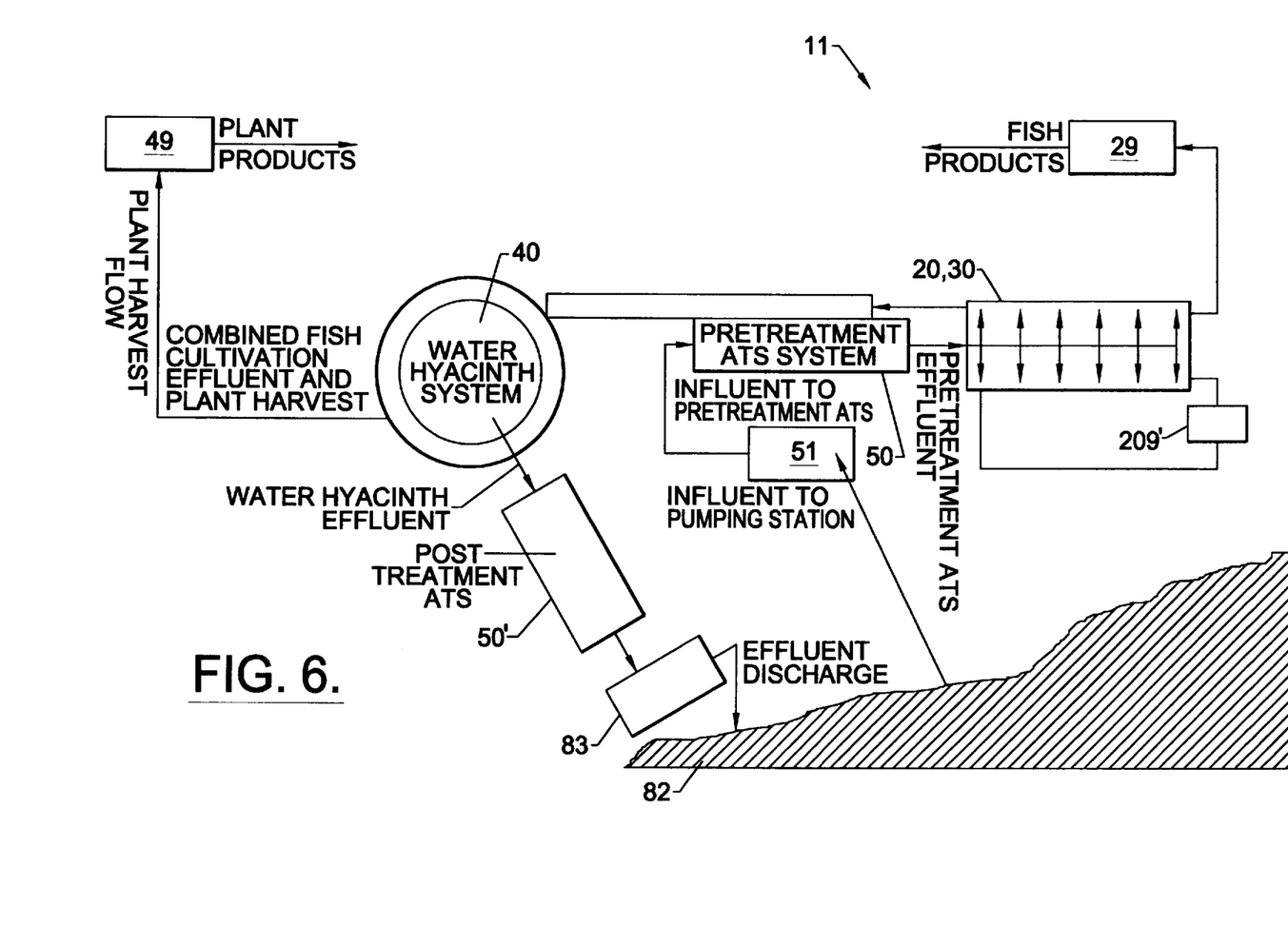
FIG. 6 is a flow schematic diagram for the system in flow-through mode.

Two operational modes are considered for the system, the recycle mode (FIGS. 3 and 5) and the flow-through mode (FIGS. 4 and 6).

Recycle Mode System

The system embodying a recycle mode comprises three principal unit processes—a fish cultivation system including tanks 20 and/or ponds 30 with supplemental aeration capabilities; a water hyacinth system 40; and an algal turf scrubber system 50. The combined operation of these units results in the realization of at least three products— processed water hyacinths for livestock, fish feed, or soil amendment products; processed algae for livestock, fish feed, or soil amendment products; and fish products from three species (catfish, hybrid striped bass, and Tilapia) for human consumption.

FIG. 5 is a preferred layout illustrating an exemplary placement of the components of the system 10.

High-quality water is lifted at recycle pump station 60 into an open fish production pond influent flume system 61, which may comprise, for example, geomembrane. The flow rate is preferably sufficient to flush the fish production ponds 20 and tanks 30 completely once or twice per day. The inlets to the ponds 20 comprise a series of production pond influent laterals 205. The ponds 20 are preferably of circular design and have an influent weir for flow control. The fish cultured within the production systems may comprise any or all of channel catfish, Tilapia, and hybrid striped bass, or other freshwater species. Preferably each production system contains a unitary species of fish. Also preferably, each production system is adapted to culture a unitary species of fish within a predetermined size range, which permits the culturing of a group of fish having similar size in each system. Means may also be provided for controlling the temperature within the system, for maximizing the growth rate of the fish.

Population regulation means may also be applied, whereby, for Tilapia, for example, a predominantly male population is achieved, which also maximizes the fish size. This is accomplished by converting a collection of young fish to males by exposing them to low concentrations of testosterone. Other methods of assuring an all-male population include the use of super-male breeders, or certain hybrids that yield all-male or predominantly male offspring (Hsiao, 1996; Tave, 1990; Stickney, 1994; Aldridge, 1996).

The pond outlet comprises a center effluent system having a riser to facilitate level control and continuous solids removal. The center effluent system discharges to a hyacinth influent distribution box 62 through a series of production pond effluent laterals 206. The level control risers are contained within the hyacinth influent distribution box 62.

When harvesting of the fish stock within a pond 20 or tank 30 is required/desired, a central fish harvest line 63 is opened, and the fish are diverted to a fish harvest box 64, from which they can be pumped, graded, and hauled as desired. The initial sizing and engineering criteria are for establishing feasible standing crop levels for the three fish species selected such that water quality does not deteriorate beyond the exemplary limits of 6.00 mg $l^{-1}$ dissolved oxygen; 5.00 mg $l^{-1}$ TKN; 0.25 mg $l^{-1}$ total phosphorus; or 50 mg $l^{-1}$ $BOD_5$. Harvesting of catfish is done at 227 g (0.5 lb); Tilapia at 454 g (1 lb); and hybrid striped bass at 681 g (1.50 lb. Hybrid striped bass are evaluated on a batch flow basis. The influent to the fish ponds from the ATS is set at a constant 12.47 mg $l^{-1}$ CBOD (8.33 mg $l^{-1}$ $BOD_5$), 0.02 mg $l^{-1}$ total phosphorus and 3.65 mg $l^{-1}$ NBOD (0.80 TKN).

With all three species, standing crops will be maintained such that the water quality does not deteriorate below the previously noted exemplary standards.

Flow from the hyacinth influent distribution box 62 is delivered to the inlet 494 of the hyacinth cultivation pond 40 through a series of hyacinth influent lines 65. The inlet 494 is preferably positioned at the center and bottom of the pond 40. The pond 40 is sized appropriately to permit reduction of key pollutants, the control of which is important to the viability of the integrated aquaculture system 10. The key pollutants include, but are not limited to, total suspended solids, total nitrogen, ammonia nitrogen, nitrate nitrogen, biochemical oxygen demand (BOD), total phosphorus, salts, residual metals, and pathogenic organisms.

Pollution abatement within the hyacinth pond 40 results from the direct and indirect effects of the cultivated crop of the floating aquatic plant water hyacinth (*Eichhornia crassipes*). Optimal operation of the system includes harvesting of excessive plant growth, which may occur on a daily basis. This permits the standing crop to be maintained at a relatively constant level and the growth rate to be sustained at optimal levels.

The WHS 40 further comprises means for selective harvesting of at least a portion of the crop at predetermined intervals, preferably selected to permit the growth to remain in log phase, which maximizes the removal of the pollutant nutrients through direct plant uptake. This also sustains an efficient transfer of oxygen through the root structures to associated chemoautotrophic and heterotrophic bacterial communities, which oxidize the reduced nitrogen compound ammonia, and metabolize, through aerobic pathways, residual carbonaceous materials.

An effective management and harvesting of plants is believed to rely upon a random movement of the standing mass of plants, or standing crop, within the pond, such movement being facilitated by winds, currents, and other naturally occurring forces. Preferably the rate of harvest equals or approximates the daily new tissue contribution from crop growth, so that there is no net accumulation of standing crop.

The quotient of the average weight of the standing crop divided by the average daily removal weight is known as the mean plant age or mean plant retention. System effectiveness is dependent in part upon the maintenance of a preselected mean plant age based upon projected and actual growth rates and levels of nutrients within harvested plant tissue.

The initial sizing of the pond may be based, for example, upon the HYADEM model (Stewart et al., 1983), which is founded upon nutrient uptake within the plant biomass and documented performance regarding oxidation of carbonaceous and reduced nitrogenous compounds. The effluent from the WHS feeds the ATS system.

Preferably the hyacinth pond 40 is equipped with a central berm 41 for hydraulic isolation, thereby allowing continued operation of one half during planned drawdown for cleaning of an adjacent half.

Hyacinth harvesting is accomplished via the hyacinth harvest road 66 by, for example, a conventional track hoe with a modified pickup device that will allow drainage of free water as the plants are removed. Preferably the track hoe first pivots to allow the capture of a crop portion from the pond 40 and then rotates 180 degrees before releasing the plants into the hyacinth system harvest and effluent flume 67, which is adjacent the pond periphery and preferably has a depth of 1.5–2.5 ft. The flume 67 is designed to provide a flow velocity of about 2 feet per second and a flow rate generally equal to that of the recycle pump station 60. The flume 67 is adjacent the hyacinth harvest road 66, the flume 67 and road 66 preferably each encompassing at least 80% of the pond periphery.

The source of the flow within the hyacinth system harvest and effluent flume 67 is the effluent from the hyacinth pond 40 outlet, which comprises a series of hyacinth peripheral effluent lines 79. This flume 67 thus serves the dual function of transporting both effluent and hyacinth harvest. Along the path of the flume 67, a vertical conveyor 68 lifts the plants from the water stream and deposits them onto a cross conveyor 69, which deposits the plants into a chopper 70. The chopper 70 preferably reduces the plant material to pieces less than 1 square inch. This process reduces the overall volume of the harvest.

The chopped material is then transported to a vermicomposting unit 71, which comprises, for example, the earthworm (*Eisenia foetida*). Specifically, the chopped plant material is placed within a holding area 499 to allow removal of free water prior to placement upon the vermicomposting windrows 494. These windrows 494 in an exemplary embodiment are approximately 5 ft wide and 1.5–2.5 ft deep. Fresh material may be placed upon the working rows with a manure-type spreader (not shown). The windrows 494 are preferably covered to prevent excessive water or heat interfering with the process. The area under the windrows 494 may be underdrained.

This subsystem yields two products: a composted organic soil and earthworm biomass. The former is useful as an organic soil amendment or organic fertilizer; the latter, as fish feed.

Following the conveyors 68,69, effluent continues down the flume 67, which becomes the algal turf scrubber influent flume 72. Water from this flume 72 is distributed via a plurality of ATS inlets 505 to a plurality of ATS units 50. Each ATS comprises attached periphytic algae disposed along a shallow, sloped floway to control certain water pollutants. Here the ATS serves to remove excess carbon dioxide, further nitrogen and phosphorus, and dissolved oxygen. In addition, organic contaminants and pathogenic organisms are further attenuated.

Means may be provided for regulating the flow of water passing across the ATS surface for optimizing nutrient uptake thereby. Such means may include, but are not limited to, an adjustable weir 507 positioned at the ATS inlets 505.

In addition, means may be provided for controlling the turbulence of the water passing across the ATS surface, which also serves to optimize nutrient uptake thereby, which may be accomplished by a mixing means.

The ATS units 50 also require periodic harvesting. An ATS harvest road 73 permits access to the units 50 for the removal and capture of the algal harvest. This harvest may be used as an internal feed stock for the fish stock or as a substrate for the vermicomposting unit 71.

A model developed from the Patterson ATS data is used in sizing the ATS system needed to ensure a high-quality, highly oxygenated effluent into the fish cultivation systems. This system is projected to produce an effluent of 1.62–2.00 mg $l^{-1}$ total nitrogen; 3.22–3.63 mg $l^{-1}$ NBOD; 0.02 mg $l^{-1}$ total phosphorus; and 12.31–12.37 mg $l^{-1}$ CBOD (8.21–8.24 mg $l^{-1}$ $BOD_5$)

Effluent from the ATS units' outlets 506 is captured within the ATS effluent flume 74. Flow from this flume 74 discharges into the recycle pump station 60, from where it is recycled into the fish production pond influent flume 61.

Access to the integrated aquaculture system 10 is provided via a perimeter service road 75, which runs adjacent the fish ponds 20 and between the fish tanks 30 and the ATS units 50. Two fish production pond service roads 76,77 intersect the perimeter service road 75, each running between parallel sets of fish ponds 20 and tanks 30. respectively. The hyancinth harvest road 66 also intersects the perimeter service road 75 and is disposed between the hyacinth effluent flume 67 and the hyacinth pond 40 periphery.

Design and Operational Consideration in Flow-Through Mode

In the flow-through mode, the major process change is the replacement of units associated with treatment and distribution of recycled flow with a feed water pumping system and both pre- and post-treatment components. These changes are reflected within the generalized schematic of the system 11 of FIG. 7, when compared to the schematic for the recycle mode of FIG. 6.

For comparative purposes, it is helpful to consider an equally sized fish cultivation subsystem 20,30 as proposed for the first embodiment 10. The quality of the surface water source is considered, for example, typical of the region around the northern tributaries of Lake Okeechobee (South Florida Water Management District, 1995), these being: total phosphorus, 0.60 mg $l^{-1}$; total nitrogen, 3.50 mg $l^{-1}$; TKN, 2.5 mg $l^{-1}$; ammonia-N, 1.0 mg $l^{-1}$; NBOD, 11.5 mg $l^{-1}$; CBOD, 15 mg $l^{-1}$; pH, 6.5–7.5; and dissolved oxygen, 5.0 mg $l^{-1}$.

Using the previously described approaches for exemplary sizing the ATS 50,50' and water hyacinth 40 subsystems, it can be determined that with an additional pretreatment system 50 comprising 8 hectares (20 acres) of ATS; a conventional slow-rate sand filter bed 83 of about 0.20 hectares (0.50 acres) between the post-treatment ATS 50' and the discharge to the targeted water source 82; and an additional pumping station 51 to supply feed water from the water source 82, the first embodiment system 10 can be modified to the alternate embodiment flow-through mode 11 that supports the same fish stock while removing approximately 28.2 mtons (31.1 tons) of phosphorus per year; 91.6 mtons (100.7 tons) of nitrogen per year; and 131 mtons (144 tons) of CBOD per year from the watershed at an incoming flow rate of 1.54 $m^3$ $sec^{-1}$ (35.2 mgd), as an exemplary calculation.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method described herein are by way of example, and the scope of the invention is not limited to the exact details of the construction and operation.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

REFERENCES

Adey, W. H. 1970. The effects of light and temperature on growth rates in Boreal-subarctic crustose corallines. *Journal of Phycology* 6 (3): 269–276.

Adey, W. H. 1983. The mesocosm: a new tool for research. *Coral Reefs* 1: 194–201.

Adey, W. H. 1995. Personal Communications.

Adey, W. H., and T. Goertmiller. 1987. Coral reef algal turfs: master producers in nutrient poor seas. *Phycologia* 26 (3): 374–386.

Adey, W. H., and K. Loveland. 1991. Dynamic Aquaria: Building Living Ecosystems. Academic Press, New York, N.Y.

Adey, W. H., C. Luckett, and K. Jensen. 1993. Phosphorus removal from natural waters using controlled algal production. *Restoration Ecology* March 1993: 29–39.

Adey, W. H., and R. S. Steneck. 1985. Highly productive eastern Caribbean reefs: synergistic effects of biological, chemical, physical and geological factors. *American Society of Zoologists*. Symposia Series for undersea research. NOAA undersea research program.3 (1) 163–187, Washington, D.C. September, 1985.

Aldridge, F. J. 1996. Personal Communications, Senior Biological Scientist. Fisheries and Aquatic Sciences. Institute of Food and Agricultural Sciences. University of Florida, Gainesville, Fla. Personal Communications.

Amasek, Inc. 1985. Operation report for the City of Orlando's Iron Bridge Regional Wastewater Treatment Facility Water Hyacinth Treatment System. Orlando, Fla.

Amasek, Inc. 1988. Development and marketing alternatives for cattlefeed produced from water hyacinths. *Florida Department of Agriculture and Consumer Services.* Tallahassee, Fla.

Amasek, Inc. 1989. On-farm demonstration project for nutrient removal from dairy wastewaters by water hyacinths. *South Florida Water Management District Contract 704-M88-0571.* West Palm Beach, Fla.

Ammerman, G. R. 1989. Processing Channel Catfish, Institute of Food and Agricultural Sciences. Florida Cooperative Extension. University of Florida, Dept. of Fisheries and Aquaculture. SRC Publication 183. Gainesville, Fla.

Andrew, J. W., and Y. Matsuda. 1975. The influence of various culture conditions on the oxygen consumption of channel catfish. *Trans. Amer. Fish Soc.* 104: 322–327.

Best, G. R. 1987. Natural wetlands-Southern environment: wastewater to wetlands, where to go from here? In *Aquatic Plants for Wastewater Treatment and Resource Recovery.* Edited by K. R. Reddy and W. H. Smith. Magnolia Publishing, Inc. Orlando, Fla., 99–120.

Boyd, C. E. 1990. Water quality in ponds for aquaculture. Alabama Agricultural Experiment Station, Auburn University, Auburn, Ala. Birmingham Publishing, Birmingham, Ala.

Brezonik, P. L. 1993. Chemical kinetics and process dynamics in aquatic systems. Lewis Publishers, Boca Raton, Fla.

Canfield, D. E. 1995. Personal Communications. Professor, University of Florida, Gainesville, Fla. Institute of Food and Agricultural Sciences (IFAS).

Carpenter, R. C., J. H. Hackney, and W. H. Adey. 1991. *Limnol. Oceanogr.,* 36 (1): 40–49.

Castaldo, D. J. 1995. Trends in aquaculture: global market potential. *Feed Management* 46(5): 29–31.

Chen, E., and J. F. Gerber. 1991. Climate. In *Ecosystems of Florida,* Edited by R. L. Myers and J. J. Ewel. University of Central Florida Press, Orlando, Fla.

Cichra, C. E., and J. V. Shireman. 1990. Evaluation of aquaculture effluents. *Florida Department of Agriculture and Consumer Services.* Aquaculture Market Development Aid Program Contract 89-200019. Tallahassee, Fla.

Clough, K. S., T. A. DeBusk, and K. R. Reddy. 1987. Model water hyacinth and pennywort systems for secondary treatment of domestic wastewater. In *Aquatic Plants for Wastewater Treatment and Resource Recovery.* Edited by K. R. Reddy and W. H. Smith. Magnolia Publishing, Inc., Orlando, Fla., 775–782.

Craggs, R. J., W. H. Adey, B. K. Jessup, and W. J. Oswald. 1995. A controlled stream mesocosm for tertiary treatment of sewage. *Ecological Engineering* May 1995.

Culley, D. D. and A. E. Epps. 1973. Use of duckweed for waste treatment and animal feed. *J. Water Pollut., Control Fed.* 45:337–347.

DeBusk, T. A., and K. R. Reddy, 1987a. Wastewater treatment using floating aquatic macrophytes: management strategies. In *Aquatic Plants for Wastewater Treatment and Resource Recovery.* Edited by K. R. Reddy and W. H. Smith. Magnolia Publishing, Inc., Orlando, Fla., 643–656.

DeBusk, T. A., and K.,R. Reddy, 1987b. Density requirements to maximize productivity of water hyacinths (*Eichhornia crassipes* [Mart] Solms). In *Aquatic Plants for Wastewater Treatment and Resource Recovery.* Edited by K. R. Reddy and W. H. Smith. Magnolia Publishing, Inc., Orlando, Fla., 673–680.

Elliot, I. 1996. "Aquaculture experts say output must triple to meet demand." *Feedstuff. The weekly newspaper for agribusinesses.* April, 1996. Carol Stream, Ill.

*Feedstuff. The weekly newspaper for agribusinesses.* 1995. Carol Stream, Ill., Grains and Ingredients. Charles House, Staff Editor. September 1995.

*Florida Agriculture.* A Florida Farm Bureau Publication. 1995. Okeechobee county looking for a miracle. 54(6): 1. 12–13.

Florida Department of Agriculture and Consumer Services (FDACS). 1991. *Florida Agricultural Statistics Service.* Florida Aquaculture. Orlando, Fla.

Gempesaw, C. M., F. F. Wirth, J. R. Bacon, and G. F. Vaughn. 1991. The economics of integration versus specialization: the case of hybrid striped bass pond culture. *Agricultural Experiment Station Bulletin* 492, University of Delaware College of Agricultural Sciences. Newark, Del.

Griffith, P. C., J. D. Cubit, W. H. Adey, and J. N. Norris. 1987. Computer-automated flow respirometry: metabolism measurements on a Caribbean reef flat and in a microcosm. *Limnol. Oceanog.* 32(2): 442–451.

Hawken, P. 1994. The ecology of commerce. Harper Business, a Division of Harper Collins Publishers. New York, N.Y.

Hayes, T. D., H. R. Isaacson, K. R. Reddy, D. F. Chynoweth, and R. Biljetina. 1987. Water hyacinth systems for water treatment. In *Aquatic Plants for Wastewater Treatment and Resource Recovery.* Edited by K. R. Reddy and W. H. Smith. Magnolia Publishing, Inc. Orlando, Fla., 121–140.

Hersch, V. 1993. The price of clean water. *Florida Trend,* January 1993: 30–35.

Hsiao, S. M. T. 1996. Personal Communications. Assistant Scientist. Center for Advanced Studies in Marine Aquaculture. The Whitney Laboratory. University of Florida. St. Augustine, Fla.

Kadlec, R. H. 1979. Wetland tertiary treatment at Houghton Lake, Michigan. In *Proceedings: Aquaculture Systems for Wastewater Treatment.* Edited by R. K. Bastian and S. C. Reed. USEPA Publication MCD-67.

Keenum, M. E., and J. E. Waldrop.1988. Economic analysis of farm-raised catfish in Mississippi. Mississippi Agricultural and Forestry Experiment Station, Mississippi State University, Starkesville, Miss.

Kirk, J. T. O. 1983. Light and photosynthesis in aquatic ecosystems. Cambridge University Press, Cambridge, U.K.

Koopman, B. E., P. Lincoln, H. Kang, and S.-I, Lee. 1987. Biological flocculation of microalgae grown on anaerobic digester effluent. In *Aquatic Plants for Wastewater Treatment and Resource Recovery.* Edited by K. R. Reddy and W. H. Smith. Magnolia Publishing, Inc. Orlando, Fla., 705–712.

Lazur, Andrew. 1995, 1996. Personal Communications. Assistant Professor. Aquaculture facilities, Blountstown, Fla. Department of Fisheries and Aquatic Sciences. Institute of Food and Agricultural Sciences. University of Florida, Gainesville, Fla.

Lineweaver, H., and D. Burk. 1934. The determination of enzyme dissociation constants. *J. Am. Chem. Soc.* 56: 658.

Mattei, E. 1994. Twenty years and holding: an assessment of catfish raceways. *Aquaculture Magazine.* May/June 1994: 48–55.

Metcalf & Eddy, Inc. 1991. Wastewater Engineering, Treatment, Disposal and Reuse. Revised by George Tchobanglous. McGraw-Hill, Inc., New York.

Moreland, A. F., and B. R. Collins. 1990. Water hyacinths grown in municipal wastewater as a source of organic matter in rabbit food, Final report to Amasek, Inc., Cocoa, Fla. Department of Small Animal Clinical Sciences, College of Veterinary Medicine, University of Florida, Gainesville, Fla.

Musil, C. F., and C. M. Breen. 1977. The application of growth kinetics to the control of *Eichhornia crassipes* [Mart} Solms through nutrient removal by mechanical harvesting. *Hydrobiologia* 53: 165–190.

Myers, R. A., N. J. Barrowiman, J. A. Hutchings, and A. A. Rosenberg. 1995. Population dynamics of exploited fish stocks at low population levels. *Science* 269: 1106–1107.

National Marine Fisheries Service. 1996. Fisheries Statistics Division. F\RE1,NMFS, Washington D.C.

Odum, H. T. 1957. Trophic structure and productivity of Silver Springs, Fla. *Ecol. Monogr.* 27: 55–112.

Odum, H. T. 1970. Environment, power and society. Wiley-Interscience, John Wiley & Sons, Inc. New York, N.Y.

Odum, H. T., K. C. Ewel, J. W. Ordway, and M. K. Johnston. 1976. Cypress wetlands for water management, recycling, and conservation. Third Annual Report to the National Science Foundation and The Rockefeller Foundation. Center for Wetlands, University of Florida, Gainesville, Fla.

*Orlando Sentinel.* 1995. Catfish farming no longer Florida's catch of the day. Jerry Jackson. Apr. 23, 1995 Orlando, Fla.

Oswald, W. J., E. W. Lee, B. Adan, and K. H. Yao. 1978. New wastewater treatment methods yield a harvest of saleable algae. *W.H.O. Chron.* 32: 328–350.

Owens, M., R. N. Edwards, and J. W. Gibbs. 1964. Some reaeration studies in streams. *J. Air and Water Poll.* 8: 469–486.

Parfit, M. 1995. Diminishing returns: exploiting the Ocean's bounty. *National Geographic* 188(5): 2–37.

Parker, N. C. 1996. "Tech Studies if Cattle Wastes can be used to grow fish," Range and Wildlife Science Department. Texas Tech University (806)742-3597.

Petrell, R. J., and L. O. Bagnall. 1987. Modeling of the hydromechanical characteristics of water hyacinth plants. In *Aquatic Plants for Wastewater Treatment and Resource Recovery.* Edited by K. R. Reddy and W. H. Smith. Magnolia Publishing, Inc., Orlando, Fla., 681–686.

*Readers Digest.* 1995. How to be sure your seafood is safe. John Pekkanen and Carol Krucoff, July, 1995. Pleasantsville, N.Y., 120–123.

Ryther, J. H. 1969. Photosynthesis and fish production in the sea. *Science* 166: 72–76.

Safina, C. 1994. Where have all the fishes gone? *Issues* Spring 1994. 37–43.

Schwartz, M. F., and C. E. Boyd. 1995. Constructed wetlands for treatment of channel catfish pond effluents. *The Progressive Fish-Culturist* 57(4): 255–266.

*Self.* 1995. Down on the fish farm. Norman Boucher. May 1995. New York, N.Y., 159–166.

South Florida Water Management District. 1995. Water quality data base. West Palm Beach, Fla.

Stewart, E. A. 1976. A study of differences in vertical phosphorus profiles within the sediments of selected Florida lakes as related to trophic dynamics. M.S. Thesis. Florida Technological University (now the University of Central Florida). Department of Civil Engineering and Environmental Studies, Orlando, Fla.

Stewart, E. A. 1979. Utilization of water hyacinths for control of nutrients in domestic wastewater—Lakeland, Fla. In *Proceedings: Aquaculture Systems for Wastewater Treatment.* Edited by R. K. Bastian and S. C. Reed. USEPA Publication MCD-67.

Stewart, E. A., D. L. Haselow, and N. M. Wyse. 1983. A practical model for water hyacinth based wastewater management design and operation. In *Future for Water Reuse. Proceedings Water Reuse Symposium III.* San Diego, Calif.

Stewart, E. A., D. L. Haselow, and N. M. Wyse. 1987. Review of operations and performance data on five water hyacinth based treatment systems in Florida. In *Aquatic Plants for Wastewater Treatment and Resource Recovery.* Edited by K. R. Reddy and W. H. Smith. Magnolia Publishing, Inc. Orlando, Fla., 279–294.

Stickney, R. R. 1994. Principles of aquaculture. John Wiley & Sons, Inc. New York, N.Y.

Stumm, W., and J. J. Morgan. 1995. Aquatic chemistry: chemical equilibria and rates in natural waters. John Wiley & Sons, Inc., New York, N.Y.

Tave, D. 1990. Supermale Tilapia. *Aquaculture Magazine.* March/April 1990. 69–72.

Taylor, G. J., and A. A. Crowder. 1983. Uptake and accumulation of heavy metals by *Typha latifolia* in wetlands of the Sudbury, Ontario region. *Can. J. Bot.* 61: 63–73.

Tchobanoglous, G. 1987. Aquatic plant systems for water treatment: engineering considerations. In *Aquatic Plants for Wastewater Treatment and Resource Recovery.* Edited by K. R. Reddy and W. H. Smith. Magnolia Publishing, Inc., Orlando, Fla., 27–48.

U.S. Army Corps of Engineers 1975 Savannah District. Wastewater Treatment Unit Processes, Design and Cost-Estimating Data. Atlanta, Ga.

U.S. Department of Agriculture. 1982. Research results in manure digestion, runoff, refeeding, odors. North Central Regional Research Publication No. 284. Iowa State University, Ames, Iowa.

U.S. Department of Commerce. 1991. National Oceanic and Atmospheric Administration. Analysis of consumer perspectives on fish and seafood. Prepared for the National Fish and Seafood Promotional Council. Washington D.C.

U.S. Environmental Protection Agency. 1993. Municipal Wastewater Treatment Technology. Recent Developments. Noyes Data Corporation. Park Ridge, N.J. ISBN 0-8155-1309-7.

Wolverton, B. C., R. M. Barlow, and R. C. McDonald. 1976. Application of vascular aquatic plants for pollution removal. energy, and food production in a biological system. *Biological Control for Water Pollution.* 141–149. University of Pennsylvania Press, Philadelphia, Pa.

Wolverton, B. C., and R. C. McDonald, 1979. Upgrading facultative wastewater lagoons with vascular aquatic plants. *J. Water Pollut., Control Fed.* 51: 305–313.

Zajicek, P. 1995. Personal communication. Bureau of Seafood and Aquaculture. Florida Department of Agriculture and Consumer Services. Tallahassee, Fla.

What is claimed is:

1. An integrated aquaculture system comprising:
   fish culturing subsystem comprising means for culturing a desired species of fish, the culturing means having an inlet for admitting water and an outlet for removing water degraded by fish excretion;

a vascular aquatic plant subsystem for treating the degraded water having an inlet in fluid communication with the body of water outlet and an outlet, the aquatic plant subsystem comprising a plant species adapted to remove excess nutrients and pollutants from the degraded water to produce water having improved cleanliness; and a cultured alga subsystem having an inlet in fluid communication with the aquatic plant subsystem outlet and an outlet in fluid communication with the body of water inlet, the algae subsystem for further removing excess nutrients from the water emerging from the aquatic plant subsystem and for replenishing dissolved oxygen to the water, the water exiting the cultured alga subsystem sufficiently clean and oxygenated to support growth of the desired fish species.

2. The integrated aquaculture system recited in claim 1, further comprising means for harvesting the fish from the fish culturing subsystem for producing useful biomass therefrom.

3. The integrated aquaculture system recited in claim 1, wherein the culturing means comprises a pond.

4. The integrated aquaculture system recited in claim 1, wherein the culturing means comprises a tank.

5. The integrated aquaculture system recited in claim 4, wherein the tank comprises a structured raceway.

6. The integrated aquaculture system recited in claim 1, wherein the culturing means is adapted for culturing at least one of a fish selected from a group consisting of channel catfish, Tilapia, and hybrid striped bass.

7. The integrated aquaculture system recited in claim 1, wherein the culturing means comprises a pond and a tank.

8. The integrated aquaculture system recited in claim 7, wherein the pond and the tank comprise a plurality of ponds and tanks, each pond and each tank for culturing a unitary species of fish.

9. The integrated aquaculture system recited in claim 8, wherein each pond and each tank are adapted to culture a unitary species of fish within a predetermined size range, for culturing a group of fish of similar size in each pond and each tank.

10. The integrated aquaculture system recited in claim 1, further comprising means for controlling a temperature within the culturing means for maximizing a growth rate of the desired fish species.

11. The integrated aquaculture system recited in claim 1, further comprising means for regulating a population of the desired fish species, for maximizing a size of the fish.

12. The integrated aquaculture system recited in claim 11, wherein the population regulating means comprises means for achieving a predominantly male population of the fish.

13. The integrated aquaculture system recited in claim 1, wherein the vascular plant species has an ability to uptake phosphorus, for removing excess phosphorus from the degraded water and further for controlling a population of phytoplankton within the enclosed body of water.

14. The integrated aquaculture system recited in claim 13, wherein the vascular plant species further has an ability to uptake nitrogen and oxidize ammonia in the degraded water.

15. The integrated aquaculture system recited in claim 14, wherein the vascular plant species further has an ability to remove total suspended solids from the degraded water.

16. The integrated aquaculture system recited in claim 15, wherein the vascular plant species further has an ability to reduce biochemical oxygen demand in the degraded water.

17. The integrated aquaculture system recited in claim 13, wherein the vascular plant species comprises water hyacinth.

18. The integrated aquaculture system recited in claim 1, wherein the vascular aquatic plant subsystem comprises means for retaining a body of water having a dividing wall separating the body of water into two sections, for permitting a cleaning treatment of one section while the other section remains in operation.

19. The integrated aquaculture system recited in claim 1, wherein the cultured algal subsystem comprises an algal turf scrubber system.

20. The integrated aquaculture system recited in claim 19, wherein the cultured alga subsystem further comprises means for controlling a flow of water passing across the algal turf scrubber for optimizing nutrient uptake by the algae.

21. The integrated aquaculture system recited in claim 20, wherein the cultured alga subsystem further comprises means for controlling a turbulence of the water passing across the algal turf scrubber for optimizing nutrient uptake by the algae.

22. The integrated aquaculture system recited in claim 1, further comprising means for controlling a flow of water between the fish culturing means inlet and the aquatic plant subsystem outlet in response to a measured nutrient concentration and for retaining the degraded water within the aquatic plant subsystem until the nutrient concentration is reduced to a predetermined level.

23. The integrated aquaculture system recited in claim 1, further comprising means for harvesting the plant species at predetermined intervals, for optimizing a growth rate of the plant species and for maximizing the nutrient and pollutant removal.

24. The integrated aquaculture system recited in claim 23, further comprising means for chopping the harvested plant species into plant material, for reducing a size thereof.

25. The integrated aquaculture system recited in claim 24, further comprising means for composting the plant material, for forming an organic soil amendment.

26. The integrated aquaculture system recited in claim 25, wherein the composting means comprises a vermicomposting unit comprising a windrow containing earthworms.

27. An integrated aquaculture system for treating water comprising:

a first aquatic plant subsystem having an inlet for admitting incoming water needing treatment and an outlet and further having sufficient treatment capacity to produce water of a quality sufficient to support growth of a desired fish species;

a fish culturing subsystem comprising an enclosed body of water adapted for culturing the desired fish species, the body of water having an inlet in fluid communication with the first aquatic plant subsystem outlet and an outlet for removing water degraded by fish excretion; and a second aquatic plant subsystem for treating the degraded water having an inlet in fluid communication with the body of water outlet and an outlet in fluid communication with the body of water inlet, the aquatic plant subsystem adapted to remove excess nutrients and other pollutants from the degraded water.

28. A method for treating wastewater comprising the steps of:

introducing water to be treated into a first aquatic plant subsystem having sufficient treatment capacity to produce water of a quality sufficient to support growth of a desired fish species;

passing water treated by the first aquatic plant subsystem into a fish culturing subsystem containing the desired fish species; and passing water degraded by fish excreta into a second aquatic plant subsystem for treating the degraded water by removing excess nutrients and other pollutants therefrom.

29. A method for maximizing a production of biomass from an integrated aquaculture system, the method comprising the steps of:

culturing a desired species of fish within an enclosure;

passing water degraded by fish excreta from the enclosure into an aquatic plant subsystem containing a vascular plant species adapted to remove excess nutrients from the degraded water;

passing water treated by the vascular plant species over a periphytic system of algae; and recycling the water treated by the algae into the fish enclosure.

30. The method recited in claim 29, further comprising the steps of:

determining an optimal value of a growth parameter for the desired fish species; and controlling the growth parameter within the body of water to approximately achieve the optimal value of the growth parameter, thereby achieving a maximum amount of fish biomass.

31. The production maximization method recited in claim 30, wherein the growth parameter comprises one or more parameters selected from the group consisting of feeding rate, dissolved oxygen level, water temperature, nitrogen level, and phosphorus level.

* * * * *